United States Patent [19]

Stockmaster

[11] Patent Number: 4,687,276

[45] Date of Patent: Aug. 18, 1987

[54] CONNECTOR CLIP FOR RIBBON CABLE CONNECTOR

[75] Inventor: Edward F. Stockmaster, Mentor, Ohio

[73] Assignee: The Babcock & Wilcox Company, New Orleans, La.

[21] Appl. No.: 904,739

[22] Filed: Sep. 5, 1986

[51] Int. Cl.[4] ............................................ H02B 1/02

[52] U.S. Cl. .................................... 439/557; 439/492

[58] Field of Search ............ 339/17 F, 176 MF, 91 R, 339/125 R, 128, 103 M

[56] References Cited

U.S. PATENT DOCUMENTS 3,432,802 3/1969 Ritchie ............................... 339/128

*Primary Examiner*—Eugene F. Desmond

*Attorney, Agent, or Firm*—Vytas R. Matas; Robert J. Edwards

[57] ABSTRACT

A one-piece clip defines a receptacle for receiving a ribbon cable connector. Spring 10 tabs are provided at ends of the clip for permitting insertion and retention of the clip within a rectangular slot of a panel. The cable connector is insertable into the receptacle of the clip and the clip is insertable into the back panel by hand and without the need for any tools.

14 Claims, 7 Drawing Figures

FIG. 1
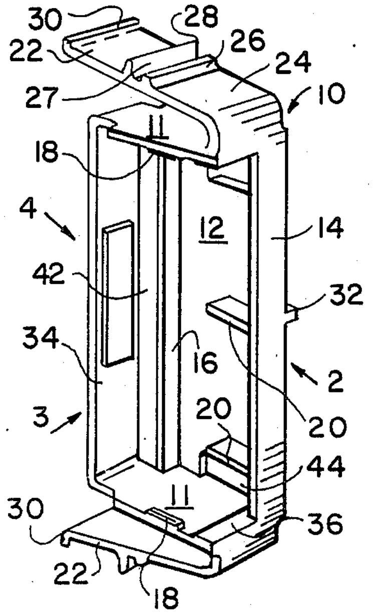
FIG. 2
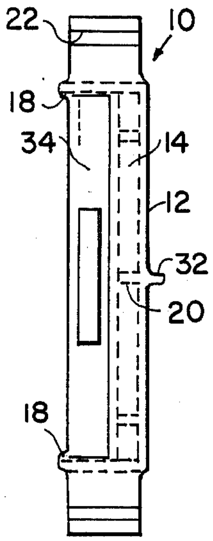
FIG. 3
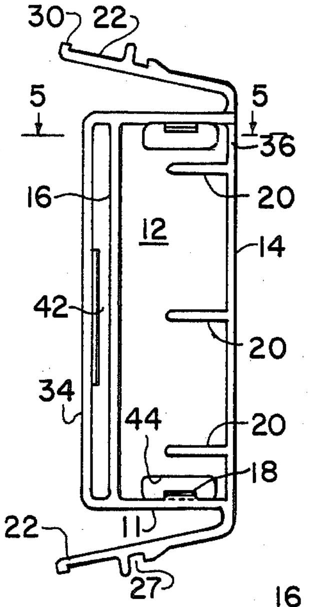
FIG. 4
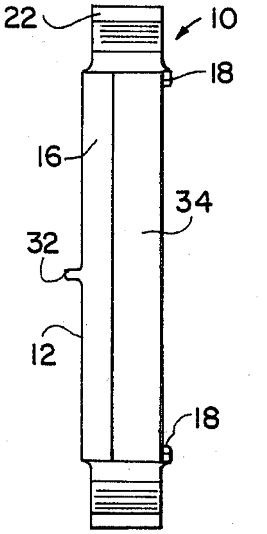
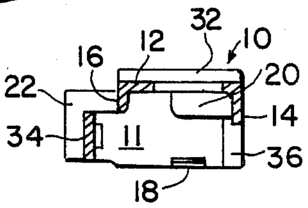
FIG. 5

FIG. 6
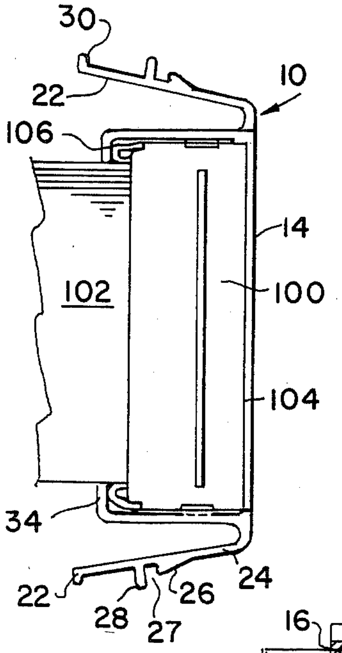
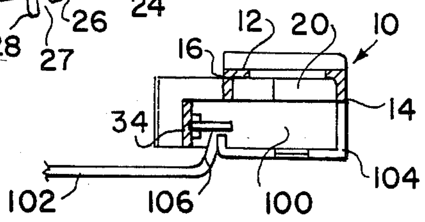
FIG. 7

CONNECTOR CLIP FOR RIBBON CABLE CONNECTOR

BACKGROUND OF THE INVENTION

The present invention relates, in general, to electronic cable connectors, and in particular to a new and useful connector clip for ribbon cable connectors.

The securing of card-edged type cable connectors to a plane or panel has generally been ignored by the manufacturer of these type of connectors. The manufacturers either fail to provide any means of retaining their cable connectors or provide simple mounting feet at either end of the connector. These mounting feet may have clearance holes or be threaded for screw type fasteners.

Another method of securing these types of connectors is to provide additional hardware which could be constructed as a hood. The hood may provide both a means of mounting the completed cable assembly and a means to strain relief for electrical contacts of the connector.

SUMMARY OF THE INVENTION

The present invention seeks to provide an efficient and economical means for securing ribbon cable edge-type connectors to a back panel or plane. According to the invention, a one-piece injection molded clip is provided for this pur- pose.

The connector clip provides a generally rectangular receptacle for the cable connector. The cable connector is insertable into the receptable and held by projection of the clip. The clip has external resilient spring tabs and a generally rectangular cross-section so that it is insertable into a rectangular slot of a back panel or plane. Projections on the spring tabs hold the clip in the slot. The clip can be attached and detached from the panel and the cable connector can be inserted and removed from the clip, by hand, without the need for any tools.

A side wall of the clip is provided with a raised rib which is insertable into a notch of the rectangular slot to provide a polarization indication and a mechanical stop to off load the spring tabs to avoid over stressing of these tabs. In this way, the clip can be inserted into the slot only in one way so that the cable connector is properly oriented in the slot.

Accordingly, an object of the invention is to provide a clip which can carry a ribbon cable connector and which can be insertable into an opening in a panel without the use of any tools.

A further object of the invention is provide a clip which is simple in design, rugged in construction and economical to manufacture.

The various features of novelty which characterize the invention are pointed out with particularly in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

FIG. 1 is a perspective view showing the connector clip in accordance with the invention:

FIG. 2 is a front elevational view taken in direction of arrow 2 in FIG. 1:

FIG. 3 is a side elevational view taken in the direction of arrow 3 in FIG. 1:

FIG. 4 is a rear elevational view taken in the direction of arrow 4 of FIG. 1;

FIG. 5 is a sectional view taken along lines 5—5 of FIG. 3.

FIG. 6 is a view similar to FIG. 2, but with a ribbon cable connector attached; and FIG. 7 is a view similar to FIG. 5, but with a ribbon cable connector attached.

DESCRIPTION OF THE PREFERRED EMBODIMENT

Referring to the drawings, in particular, the invention embodied therein comprises a one-piece clip generally designated 10 which has a side wall 12 and opposite end walls 11 connected to the side wall 12 and defining with the side wall a receptacle for receiving a ribbon cable connector shown at 100 in FIGS. 6 and 7.

As shown in FIG. 1, the receptacle which is bounded at the top and bottom by end walls 11 and at one side by side wall 12, is open at its opposite side. Its rear is covered by a back strap 34. The inner surface of side wall 12 carries front and rear lips 14 and 16, respectively, and a plurality of transversely extending ribs 20. The outside surface of side wall 12 carries a polarizing and load relief rib 32 which is also visible in FIGS. 2 and 4.

Access openings 44 are provided in side wall 12 near end wall 11 and access opening 42 is provided between rear lip 16 and back strap 34.

The inner surfaces of end walls 11 carry directional snap tabs 18 and locating steps 36.

A resilient spring mounting tab 22 is connected to the outer surface of each end wall 11 near the front lip 14. Both tabs 22 extend at a diverging angle from the front of the clip to define inclined surfaces or ramps 24. A lead ramp 26 having an inclined front edge and a perpendicular rear edge is positioned on tab 22 intermediate its length. This is followed by a panel slot 27 which, at its rear, is bounded by a stop rib 28. An upturn 30 is provided at the rear end of each tab 22 to provide a grip area for removal from mounted surface.

Referring now once more to FIGS. 6 and 7, the cable connector 100 has a rectangular solid head to which the ribbon cable 102 is connected. The head of connector 100 includes a front edge 104 and rear connecting projections 106.

To attach connector 100 to clip 10, the rectangular head of connector 100 is inserted through the open side clip 10 in a direction toward the side wall 12. The front edge 104 of the connector head is seated behind the front lip 14 and against the side wall rib 120. The ends of connector 100 are held laterally by locating step 36.

The clip 10 is made of one piece and from resilient material such as polycarbonate (e.g. Lexan 940-701, a registered trademark). The one piece clip 10 can be injection molded. Its inherent resiliency permits the connector head to be pressed past the directional snap tabs 18 which then snap against the back edge of the connector head as shown in FIGS. 6 and 7. In this way, the connector head is held firmly within the clip receptacle. The connecting projections 106 bear backwardly against the back strap 34 so that the connector is held firmly in all directions within the clip 10. While the connector 100 can be removed by hand simply by spreading the end walls 11, removal may be facilitated by using simple tools, such as a screw driver or the like, which are insertable through access openings 42 and 44 to dislodge the connector head.

Once the connector is engaged in the clip 10, the clip 10 can then be inserted into an oversize rectangular slot in a back panel (not shown). Upper and lower edges of the slot bear against ramp surfaces 24 to compress the tabs 22 toward the end wall 11. The edges of the slot are then pressed past the lead ramps 26 to finally engage in panel slots 27. The forward progress of the clip 10 is stopped by the stop ribs 28. The resiliency of the material of clip 11 holds tabs 22 outwardly against upper and lower edges of the slot.

A notch may be provided in the slot which closely receives the rib 32. Rib 32 thus acts to ensure that clip 11 is inserted in the right orientation to present its connector 100 in the right polarity. Rib 32 also supports the vertical weight of the clip to remove load from the resilient tabs 22.

To remove clip 10, the tabs 22 are squeezed toward each other and the clip is simply withdrawn from the panel slot. The pulling action is facilitated by the upturns 30.

While a specific embodiment of the invention has been shown and described in detail to illustrate the application of the principles of the invention, it will be understood that the invention may be embodied without departing from such principles.

What is claimed is:

1. A connector clip for a ribbon cable connector comprising a side wall,
   - a pair of end walls connected to opposite ends of said side wall;
   - a front lip connected to said side wall and to said end walls and extending between said end walls, said side wall, end walls and front lip forming a receptacle having an open front and an open side opposite from said side wall,
   - a directional snap tab extending from each end wall to said receptacle and near a side of each end wall opposite from said side wall; and
   - a resilient spring tab connected to an outer surface of each end wall near said front lip, each spring tab extending at an angle outwardly from its respective end wall in a direction away from said front lip, each spring tab carrying a panel slot on an outer surface thereof:
   - whereby a cable connector is insertable, without the aid of any tools, into said receptacle behind said front lip, said snap tabs being engaged against the connector for retaining the connector in said receptacle, said spring tabs being resiliently movable toward each other for receiving edges of a panel opening in said panel slots to hold said clip to a panel having panel openings.

2. A clip according to claim 1, including a locating step defined on an inner surface of each end wall, said locating steps being spaced from each other a distance equal to a width of a connector to be engaged in said receptacle for positioning the connector.

3. A clip according to claim 2, including a plurality of side wall ribs defined on an inner surface of said side wall and extending into said receptacle for supporting a connector held against said side wall rib by said directional snap tabs.

4. A clip according to claim 3, including a back strap connected to and extending between said end walls at rear sides of said end walls opposite from said front lip, said back strap defining an access opening with said side wall.

5. A clip according to claim 4, including a rear lip connected to said side wall and extending into said receptacle, said rear lip bounding said access opening.

6. A clip according to claim 5, wherein said side wall includes additional access openings adjacent each of said end walls.

7. A clip according to claim 3, including a lead ramp defined on the outer surface of each spring tab and a stop rib defined on the outer surface of each spring tab, said panel slot for each spring tab being defined between said stop rib and said lead ramp for each spring tab.

8. A clip according to claim 7, including an up turned portion at an end of each spring tab turned outwardly away from a respective end wall and positioned at an end of each tab spaced away from said front lip.

9. A clip according to claim 3, including a load relief rib defined on an outer surface of said side wall.

10. A clip according to claim 9, including a lead ramp defined on the outer surface of each spring tab and a stop rib defined on the outer surface of each spring tab, said panel slot for each spring tab being defined between said stop rib and said lead ramp for each spring tab.

11. A clip according to claim 9, including a rear lip connected to said side wall and extending into said receptable.

12. A clip according to claim 1, wherein said side wall, end wall, front lip, directional snap tabs and spring tabs are made of a single piece of resilient material.

13. A clip according to claim 12 wherein said resilient material is plastic.

14. A clip according to claim 11, wherein said clip is made of one piece of plastic material.

* * * * *